(12) United States Patent
Sun et al.

(10) Patent No.: US 11,024,205 B2
(45) Date of Patent: Jun. 1, 2021

(54) DISPLAY DEVICE

(71) Applicants: LITE-ON OPTO TECHNOLOGY (CHANGZHOU) CO., LTD., Changzhou (CN); LITE-ON TECHNOLOGY CORPORATION, Taipei (TW)

(72) Inventors: Fang-Jung Sun, New Taipei (TW); Shih-Chang Hsu, Taipei (TW); Chao-Ming Wu, Yilan County (TW)

(73) Assignees: LITE-ON OPTO TECHNOLOGY (CHANGZHOU) CO., LTD., Changzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 16/779,724

(22) Filed: Feb. 3, 2020

(65) Prior Publication Data
US 2020/0258434 A1 Aug. 13, 2020

(30) Foreign Application Priority Data
Feb. 13, 2019 (CN) .......................... 201910116527.3

(51) Int. Cl.
*G09F 19/20* (2006.01)
*G02B 5/20* (2006.01)
*F21V 8/00* (2006.01)

(52) U.S. Cl.
CPC ........... *G09F 19/205* (2013.01); *G02B 5/201* (2013.01); *G02B 6/0068* (2013.01)

(58) Field of Classification Search
CPC ...... G02B 6/0068; G02B 5/201; F09F 19/205
See application file for complete search history.

(56) References Cited

U.S. PATENT DOCUMENTS

| | | | |
|---|---|---|---|
| 2018/0299662 A1* | 10/2018 | Maes | G02B 26/008 |
| 2019/0228686 A1* | 7/2019 | Tsukamoto | H01L 51/5056 |
| 2019/0312220 A1* | 10/2019 | Tsukamoto | H01L 51/5004 |

* cited by examiner

*Primary Examiner* — Anne M Hines
(74) *Attorney, Agent, or Firm* — Li & Cai Intellectual Property (USA) Office

(57) ABSTRACT

A display device includes a patterned panel and a light emitting module. The patterned panel includes a light-transmitting substrate, a first light-transmitting portion, a second light-transmitting portion and a third light-transmitting portion. Each of the light-transmitting portions respectively has a first transmission spectrum, a second transmission spectrum and a third transmission spectrum. The third light-transmitting portion is adjacent to the first light-transmitting portion and the second light-transmitting portion, and the third transmission spectrum has a first overlapping part with the first transmission spectrum, and has a second overlapping part with the second transmission spectrum. The light emitting module includes a first light emitting unit and a second light emitting unit, the first light emitting unit emits a first light having a peak wavelength in the first overlapping part, and the second light emitting unit emits a second light having a peak wavelength in the second overlapping part.

20 Claims, 14 Drawing Sheets

D"

DISPLAY DEVICE

CROSS-REFERENCE TO RELATED PATENT APPLICATION

This application claims the benefit of priority to China Patent Application No. 201910116527.3, filed on Feb. 13, 2019 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a display device, and more particularly to a display device displaying specific patterns or symbols by a light emitting module.

BACKGROUND OF THE DISCLOSURE

A conventional display device has a patterned panel with specific characters or images printed thereon, and cooperates with a light emitting module which lights up the characters or images up. The characters or images are generally printed with white inks having diffusing particles. Therefore, the display color of the characters or images depends only on the color of the light source emitted by the light emitting module, and the color is relatively monotonous.

After improvements to the conventional display device, it can now provide colors of more variety in cooperation with the light source of the light emitting module, thereby providing different-colored characters or images. However, in the case of a general patterned panel, only one character or image is printed on area of the patterned panel. Therefore, a large area is required to provide a variety of display patterns and different colors.

However, with the trend in development toward light-weight, thin and small electronic products, the miniaturization of the patterned panel has become the mainstream in this technical field. Therefore, how different characters or images can be displayed in the same area of the patterned panel and match with the light source of the light source module to display different colors will greatly impact the design, size and utilization of the patterned panel and display device.

SUMMARY OF THE DISCLOSURE

In response to the above-referenced technical inadequacies, the present disclosure provides a display device, including a patterned panel and a light emitting module disposed under the patterned panel. Specifically, the patterned panel includes: a light-transmitting substrate, a first light-transmitting portion, a second light-transmitting portion and a third light-transmitting portion, the first light-transmitting portion, the second light-transmitting portion and the third light-transmitting portion all being disposed on the light-transmitting substrate. The first light-transmitting portion has a first transmission spectrum, the second light-transmitting portion has a second transmission spectrum, and the third light-transmitting portion has a third transmission spectrum, wherein the third light-transmitting portion is adjacent to the first light-transmitting portion and the second light-transmitting portion, the third transmission spectrum and the first transmission spectrum have a first overlapping part, and the third transmission spectrum and the second transmission spectrum have a second overlapping part. Further, the light emitting module includes a first light emitting unit and a second light emitting unit, the first light emitting unit emits a first light through the patterned panel, the first light has a peak wavelength in the first overlapping part, the second light emitting unit emits a second light through the patterned panel, the second light has a peak wavelength in the second overlapping part.

In certain embodiments, the third light-transmitting portion is in direct contact with the first light-transmitting portion or the second light-transmitting portion.

In certain embodiments, the third light-transmitting portion is not in direct contact with the first light-transmitting portion or the second light-transmitting portion.

In certain embodiments, the peak wavelength of the first light is not in the second transmission spectrum.

In certain embodiments, the wavelength range of the first light is in the second transmission spectrum.

In certain embodiments, the peak wavelengths of the first light and the second light are respectively from 400 nm to 550 nm, from 500 nm to 580 nm, or from 600 nm to 660 nm.

In certain embodiments, the transmittance of the first light transmitting through the first light-transmitting portion and the third light-transmitting portion is more than 5%.

In certain embodiments, the transmittance of the second light transmitting through the second light-transmitting portion and the third light-transmitting portion is more than 5%.

In certain embodiments, the light emitting module further includes a light guide plate, and the first light emitting unit and the second light emitting unit are disposed on a side of the light guide plate.

In certain embodiments, the first light emitting unit and the second light emitting unit are disposed under the first light-transmitting portion, the second light-transmitting portion, and the third light-transmitting portion.

In certain embodiments, at least one of the first light-transmitting portion, the second light-transmitting portion, and the third light-transmitting portion is in a multi-layer configuration.

In certain embodiments, the patterned panel further includes a fourth light-transmitting portion disposed on the light-transmitting substrate, and having a fourth transmission spectrum, wherein the fourth light-transmitting portion is adjacent to the third light-transmitting portion. The third transmission spectrum and the fourth transmission spectrum have a third overlapping part. The light emitting module includes a third light emitting unit, the third light emitting unit emits a third light through the patterned panel, and the third light has a peak wavelength in the third overlapping part.

In certain embodiments, the peak wavelength of the third light is not in the first transmission spectrum and the second transmission spectrum.

In certain embodiments, the wavelength range of the third light is not in the first transmission spectrum and the second transmission spectrum.

In certain embodiments, the transmittance of the third light transmitting through the fourth light-transmitting portion and the third light-transmitting portion is more than 5%.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1A:
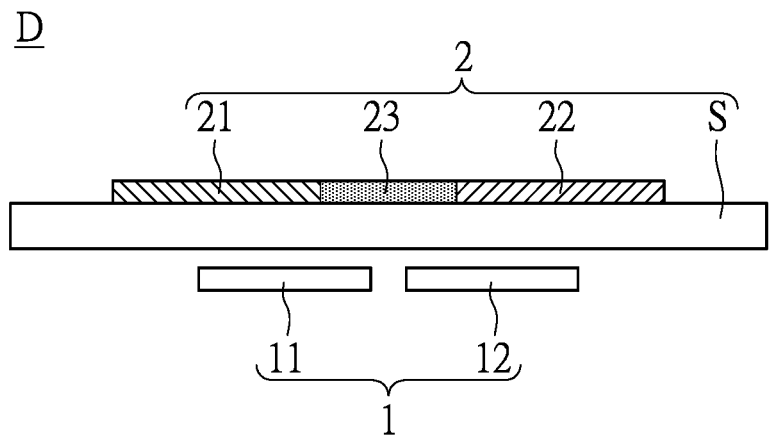
FIG. 1A is a side schematic view of a display device according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In response to the above-referenced technical inadequacies, the present disclosure provides a display device, including a patterned panel and a light emitting module disposed under the patterned panel. The light emitting module includes a plurality of light emitting units with different colors, that is, each light emitting unit can emit light of different colors. The patterned panel includes a plurality of figures, wherein the number of figures matches the number of colors of the lighting unit, and the figures partially overlap, that is, each figure has a non-overlapping area and one or more overlapping areas being shared with other figures. The transmitting spectrum of the non-overlapping area and the overlapping area of each figure has been specially selected, such that, when the light emitting unit of the first color is activated, the light emitted by the light emitting unit can pass through only one figure but no other figures, and so on. Thereby, the display device is able to display two or more types of figures in the same area. In addition, since the figure is partially overlapped in the present disclosure, the display device of the present disclosure is smaller in size than relevant commercial products currently available on the market, and effectively achieves the purpose of miniaturization.

To achieve the above objectives, the present disclosure further provides a novel patterned panel. The following description shows the details of each part of the present disclosure by taking a patterned panel with two figures and its display device.

In this embodiment, the patterned panel includes a light-transmitting substrate, a first light-transmitting portion, a second light-transmitting portion, and a third light-transmitting portion; wherein the third light-transmitting portion is adjacent to the first light-transmitting portion and the second light-transmitting portion. The first light-transmitting portion and the third light-transmitting portion correspondingly form a first figure. Further, the second light-transmitting portion and the third light-transmitting portion correspondingly form a second figure. In other words, the third light-transmitting portion is an overlapping area of the first figure and the second figure, and the first light-transmitting portion and the second light-transmitting portion are non-overlapping areas of the first figure and the second figure, respectively. It should be noted that each figure in the present disclosure does not need to be a continuous figure, and can also be a separate figure. For example, the symbol "i", which has a straight line and a point separated with the straight line. Therefore, the adjacent light-transmitting portions may be in direct contact or indirect contact. Accordingly, the first light-transmitting portion may be in direct or indirect contact with the third light-transmitting portion. Similarly, the second light-transmitting portion and the third light-transmitting portion may also be in direct contact or indirect contact. In addition, the light-transmitting portion itself can be an entire area that is uninterrupted or a discrete area. These changes are within the scope of the present disclosure.

In this embodiment, the first light-transmitting portion, the second light-transmitting portion, and the third light-transmitting portion have a first transmission spectrum, a second transmission spectrum, and a third transmission spectrum, respectively. The first transmission spectrum has a first overlapping part with the third transmission spectrum, and the second transmission spectrum has a second overlapping part with the third transmission spectrum. The first light emitting unit emits a first light within the first overlapping part so as to corresponding light the first figure. Thereby, when the first light emitting unit is activated, the first light passes through the first light-transmitting portion and the third light-transmitting portion, so that the first figure is displayed by the display device. Specifically, in order for the first light to pass through only the first figure (i.e., only pass through the first light-transmitting portion and the third light-transmitting portion, but not the second light-transmitting portion), the peak of the first light cannot be in the range of the second transmission spectrum. Preferably, the entire wavelength range of the first light is not within the second transmission spectrum. In addition, in order to obtain a better display effect, the transmittance of the first light transmitting through the first light-transmitting portion is more than 5%.

Similarly, the second light emitting unit corresponding to the second figure emits a second light, and the peak of the second light is within the range of the second overlapping part, whereby when the second light emitting unit is activated, the second light can pass through the second light-transmitting portion and the third light-transmitting portion, so that the second figure is displayed by the display device. In order for the second light to pass through only the second figure (i.e., only pass through the second light-transmitting portion and the third light-transmitting portion, but not the first light-transmitting portion), the peak of the second light cannot be in the range of the first transmission spectrum. Preferably, the entire wavelength range of the second light is not in the first transmission spectrum. Similarly, in order to obtain a better displaying effect, the transmittance (T %) of the second light transmitting through the second light-transmitting portion is more than 5%.

In the embodiments described later, the light-transmitting portion is formed of a light transmissive ink material and applied to the light-transmitting substrate in a printed method, but the present disclosure is not limited thereto. The light-transmitting portion may be made of other light transmissive materials, and be applied to a light-transmitting substrate by other methods such as evaporation or sputtering. In addition, a light diffusing agent may be added to the light-transmitting portion to increase the uniformity of the light output of the display device. Furthermore, in order to control the transmission spectrum of the light-transmitting portion, the light-transmitting portion can be configured in multiple layers in certain embodiments of the present disclosure. That is, the first light-transmitting portion, the second light-transmitting portion, or the third light-transmitting portion is composed of a plurality of light transmissive layers. For example, in certain embodiments, the light emitted by the blue light emitting unit may pass through the green ink layer, but may be blocked by the yellow ink layer. Thus, to obtain the light-transmitting portion corresponding to the green light emitting unit, not only is a green ink layer needed, but a yellow ink layer is also required. Thereby, the light of the blue light emitting unit is blocked by the yellow ink layer and cannot pass through the light-transmitting portion effectively, but the light emitted by the green light emitting unit can effectively pass through the light-transmitting portion, this allows blue and green figures to be effectively displayed separately and without interference. In some preferred embodiments, the yellow ink layer is located under the green ink layer, so that the final color of the light-transmitting portion is green, and has a good visual aesthetics.

In some embodiments, the first transmission spectrum and the second transmission spectrum are each selected from the group consisting of a wavelength range between 390 nm to 550 nm, a wavelength range from 400 nm to 600 nm, and a wavelength range between 590 nm to 800 nm. Corresponding to the foregoing wavelength range, the colors of the first light-transmitting portion and the second light-transmitting portion may be, for example, blue, green, or red. In the group of the first transmission spectrum and the second transmission spectrum, the third transmission spectrum can be selected from the group consisting of a wavelength range of 400 nm to 600 nm, a wavelength range of 480 nm to 800 nm, a wavelength range of 390 nm to 525 nm to 570 nm to 800 nm, and a wavelength range of 380 nm to 800 nm. Corresponding to the foregoing range, the color of the third light-transmitting portion may be, for example, green, yellow, magenta or transparent, and the color transparent can be white color depending on the quantity of the light diffusing agent. In addition, corresponding to the aforementioned selection group, the first overlapping part and the second overlapping part may have a wavelength range of from 390 nm to 550 nm, from 480 nm to 600 nm, and from 590 nm to 800 nm.

As mentioned above, cooperating with the aforementioned patterned panel with two figures, the light emitting module must include two light emitting units, a first light emitting unit and a second light emitting unit, and respectively emit a first light and a second light. In the present disclosure, the light emitting unit includes one or more light emitting sources, and the color of the first light and the second light must be different for the purpose of displaying the two different figures. In certain embodiments, the light emitting module is in the form of direct light emission, that is, the light emitting unit is directly disposed under the patterned panel; cooperating with the figures, the first light emitting unit and the second light emitting unit may be dispersedly disposed under the corresponding figure, that is, under the first light-transmitting portion, the second light-transmitting portion, and the third light-transmitting portion. On the other hand, as shown in FIG. 1B, in another embodiment, the light emitting module is in the form of lateral emission, that is, the light emitting module includes a light guide plate disposed under the patterned panel, and the first light emitting unit and the second light emitting unit are disposed on a side of the light guide plate. In the present disclosure, the emitting source is preferably a light source with narrow FWHM (Full Width at Half Maximum), such as a light-emitting diode or a laser diode, and the peak wavelength is preferably from 400 nm to 550 nm, from 500 nm to 580 nm, and from 600 nm to 660 nm. Corresponding to the foregoing range, the color of the light can be blue, green or red.

Furthermore, in the form of direct light emission, in addition to the overlapping area, the emitting source is preferably disposed under the figure to improve the display effect (i.e., under the overlapping area and/or the non-overlapping area of the figure), instead of under the non-overlapping area of other figures. In regards to certain embodiments, two or more light emitting units may be disposed under the overlapping area. For example, in a display device having two figures, the first light emitting unit is disposed under the first light-transmitting portion and/or the third light-transmitting portion, but not under the second light-transmitting portion. On the other hand, the second light emitting unit is disposed under the second light-transmitting portion and/or the third light-transmitting portion, but not under the first light-transmitting portion.

In addition to the foregoing type of patterned panel with two figures, the present disclosure further exemplifies a patterned panel having three figures and the display device as follows.

Regarding the patterned panel having three figures, the patterned panel includes the first light-transmitting portion, the second light-transmitting portion and the third light-transmitting portion, and further includes a fourth light-transmitting portion disposed on the light-transmitting substrate, wherein the fourth light-transmitting portion and the third light-transmitting portion are adjacent to each other to form a third figure. That is, the first figure, the second figure, and the third figure partially overlap. The third light-transmitting portion is a shared overlapping area of the three figures, and the first light-transmitting portion, the second light-transmitting portion, and the fourth light-transmitting portion are respective non-overlapping areas of the first figure, the second figure, and the third figure.

Specifically, the first light-transmitting portion, the second light-transmitting portion, the third light-transmitting portion and the fourth light-transmitting portion respectively has a first transmission spectrum, a second transmission spectrum, a third transmission spectrum and a fourth transmission spectrum. In detail, the third transmission spectrum has a first overlapping part with the first transmission spectrum and a second overlapping part with the second transmission spectrum, and further has a third overlapping part with the fourth transmission spectrum.

On the other hand, the first light emitting unit corresponding to the first figure emits a first light, the peak of the first light is within the range of the first overlapping part, but out of the second transmission spectrum and the fourth transmission spectrum, and preferably the entire wavelength range of the first light is not in the second transmission spectrum and the fourth transmission spectrum. Therefore, when the first light emitting unit is activated, the first light emitted by the first light emitting unit can pass through the first light-transmitting portion and the third light-transmitting portion, but does not pass through the second light-transmitting portion and the fourth light-transmitting portion, so that the first figure is displayed by the display device.

Similarly, the second light emitting unit corresponding to the second figure emits a second light, and the peak of the second light is within the range of the second overlapping part, but out of the first transmission spectrum and the fourth transmission spectrum, and preferably the entire wavelength range of the second light is not in the first transmission spectrum and the fourth transmission spectrum. The third light emitting unit corresponding to the third figure emits a third light, and the peak of the third light is within the range of the third overlapping part, but out of the first transmission spectrum and the second transmission spectrum, preferably the entire wavelength range of the third light is not in the first transmission spectrum and the second transmission spectrum. Therefore, when the second light emitting unit is activated, the second light emitted by the second light emitting unit can pass through the second light-transmitting portion and the third light-transmitting portion, so that the second figure is displayed by the display device. When the third light emitting unit is activated, the third light emitted by the third light emitting unit can pass through the fourth light-transmitting portion and the third light-transmitting portion, so that the third figure is displayed by the display device. Similarly, in order to obtain a better display effect, the transmittance of the third light transmitting through the fourth light-transmitting portion and the third light-transmitting portion are more than 5%.

In certain embodiments of the above display device, the light emitting module has a first light emitting unit, a second light emitting unit, and a third light emitting unit, each of them respectively emits a first light, a second light, and a third light, wherein the peak wavelength range of the first light to the third light is from 400 nm to 550 nm, 500 nm to 580 nm, and 600 nm to 660 nm. That is, the first light, the second light, and the third light are blue, green, and red, respectively. At this time, the first transmission spectrum, the second transmission spectrum and the fourth transmission spectrum correspond to a wavelength range from 390 to 550 nm, 400 to 600 nm, and 590 nm to 800 nm, respectively. That is, the first light-transmitting portion, the second light-transmitting portion, and the fourth light-transmitting portion are blue, green, and red, respectively. In this embodiment, the third transmission spectrum is preferably from 380 nm to 800 nm, that is, the third light-transmitting portion is transparent, but the color can also be white depending on the quantity of the light diffusing agent.

In addition, in the foregoing embodiment, a display device having three figures has an overlapping area (i.e., the third light-transmitting portion), but there is no overlapping area between only two of the figures. However, the present disclosure is not limited thereto. An overlapping area can be provided between the first figure and the second figure, between the second figure and the third figure, and between the first figure and the third figure, as needed. In other words, except for the first light-transmitting portion, the second light-transmitting portion, the third light-transmitting portion, and the fourth light-transmitting portion, the patterned panel further optionally includes a fifth light-transmitting portion, a sixth light-transmitting portion, and/or a seventh light-transmitting portion, and each has a fifth transmission spectrum, a sixth transmission spectrum, and a seventh transmission spectrum, respectively. Specifically, the first light-transmitting portion, the third light-transmitting portion, and the fifth light-transmitting portion and/or the seventh light-transmitting portion are adjacent to each other and constitute a first figure; the second light-transmitting portion, the third light-transmitting portion, and the fifth light-transmitting portion and/or the sixth light-transmitting portion are adjacent to each other and constitute a second figure; and the fourth light-transmitting portion, the third light-transmitting portion, and the sixth light-transmitting portion and/or a seventh light-transmitting portion are adjacent to each other and constitute a third figure. That is, in addition to the third light-transmitting portion, the fifth light-transmitting portion is another overlapping area of the first figure and the second figure, the sixth light-transmitting portion is another overlapping area of the second figure and the third figure, and the seventh light-transmitting portion is another overlapping area of the first figure and the third figure.

As the above-mentioned principle of selecting the transmission spectrum and the light emitting source, the first transmission spectrum and the third transmission spectrum have a first overlapping part with the fifth transmission spectrum and/or the seventh transmission spectrum (corresponding to the first figure), while the peak of the first light is within the overlapping part, but not within the second transmission spectrum, the fourth transmission spectrum, or the sixth transmission spectrum (corresponding to the figures excluding the first figure). Similarly, the second transmission spectrum and the third transmission spectrum have a second overlapping part with the fifth transmission spectrum and/or the sixth transmission spectrum (corresponding to the second figure), and the peak of the second light is within the range of the second overlapping part, but not in the first transmission spectrum, the fourth transmission spectrum, or seventh transmission spectrum (corresponding to the figures excluding the second figure). Similarly, the fourth transmission spectrum and the third transmission spectrum have a third overlapping part with the sixth transmission spectrum and/or the seventh transmission spectrum (corresponding to the third figure), and the peak of the third light is within the range of the third overlapping part, but not in the first transmission spectrum, the second transmission spectrum, or the fifth transmission spectrum (corresponding to the figures excluding the third figure). Thereby, the display device is able to individually display the first figure, the second figure, or the third figure as the first light emitting unit, the second light emitting unit, or the third light emitting unit, respectively.

Therefore, for example, in certain embodiments of the above display device, the peaks of the first light to the third light are respectively between a wavelength range from 400 nm to 550 nm, a wavelength range of from 500 nm to 580 nm, and wavelength range from 600 nm to 660 nm. That is, the first light, the second light, and the third light are blue, green, and red, respectively. At this time, the first transmission spectrum, the second transmission spectrum and the fourth transmission spectrum respectively correspond to a wavelength range from 390 to 550 nm, a wavelength range from 400 to 600 nm, and a wavelength range from 590 nm to 800 nm. That is, the first light-transmitting portion, the second light-transmitting portion, and the fourth light-transmitting portion are blue, green, and red, respectively. Further, the third transmission spectrum is preferably from 380 nm to 800 nm, that is, the third light-transmitting portion is transparent, and the color can be white depending on the quantity of the light diffusing agent. The fifth transmission spectrum, the sixth transmission spectrum, and the seventh transmission spectrum correspond to a wavelength range of 480 nm to 800 nm, a wavelength range of 400 nm to 600 nm, and a wavelength range of 390 nm to 525 nm and 570 nm to 800 nm, respectively. That is, the fifth light-transmitting portion, the sixth light-transmitting portion, and the seventh light-transmitting portion are yellow, green, and magenta, respectively.

In the foregoing description, the display device with the two figures or the three figures is taken as an example. However, the present disclosure is not limited thereto. The skilled person in the related disclosure can add the number of figures, light-transmitting portions and light emitting units according to practical requirements, which are all covered by the scope of present disclosure.

In order to describe the display device of the present disclosure in detail, the present disclosure further provides following embodiments.

First Embodiment

Figure 1B:
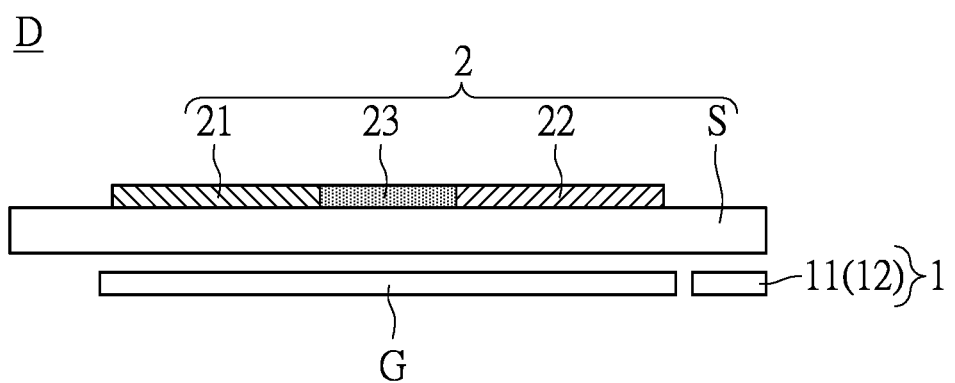
FIG. 1B is a side schematic view of a display device according to an embodiment of the present disclosure.
Figure 2A:
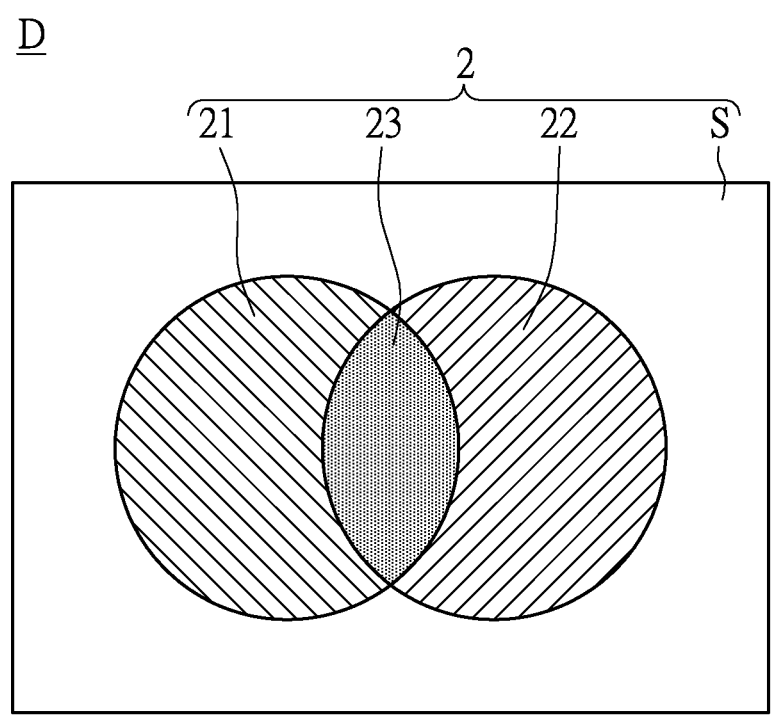
FIG. 2A is a top schematic view of a display device according to a first embodiment of the present disclosure.
Figure 2B:
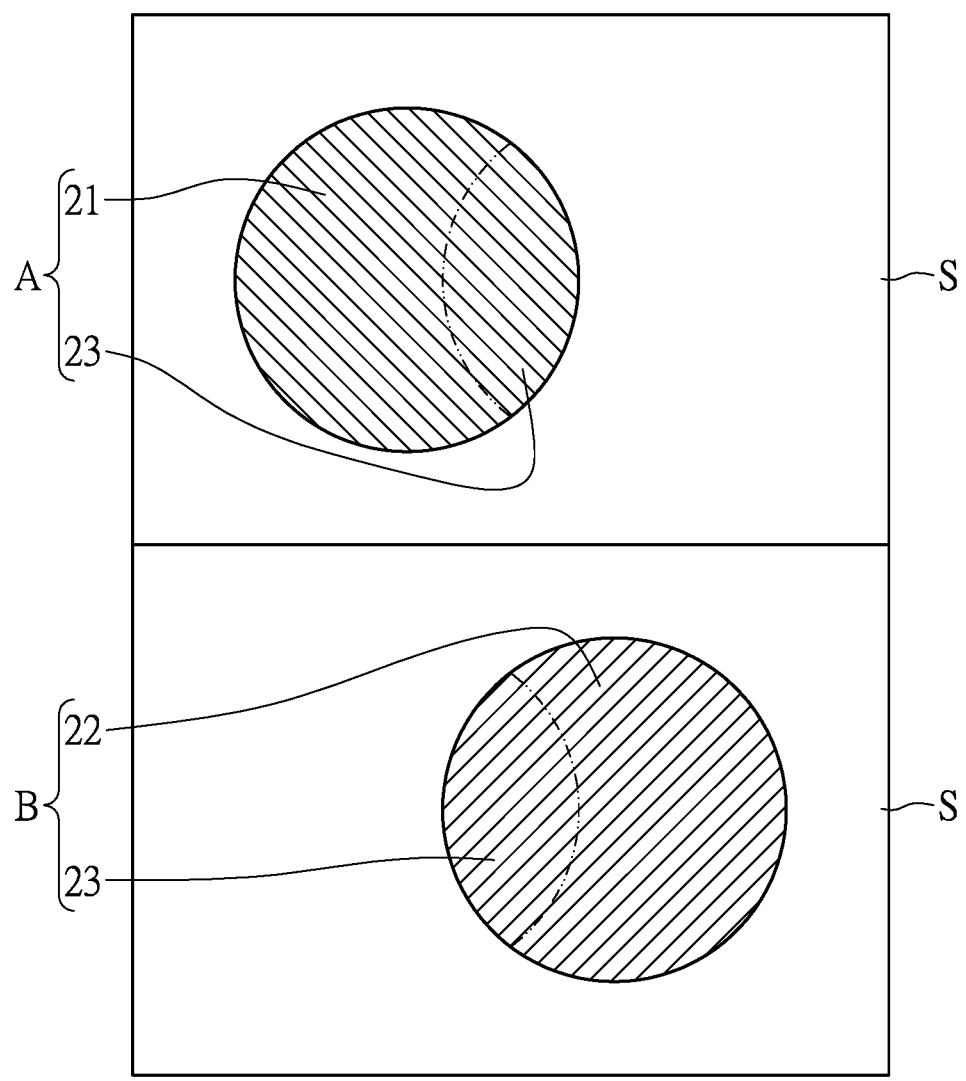
FIG. 2B is a top schematic view of a character pattern according to the first embodiment of the present disclosure.

Referring to FIGS. 1A, 1B, 2A and 2B, FIG. 1A and FIG. 1B are side sectional views of the display device D of the present disclosure, and FIG. 2A and FIG. 2B are top schematic views thereof. Referring to FIG. 1A, a first embodiment of the present disclosure provides a display device D, including a light emitting module 1 and a patterned panel 2, the patterned panel 2 is disposed on the light emitting module 1. Furthermore, the light emitting module 1 includes a first light emitting unit 11 and the second light emitting unit 12, the patterned panel 2 includes a light-transmitting substrate S, a first light-transmitting portion 21, a second light-transmitting portion 22, and a third light-transmitting portion 23. Specifically, the first light-transmitting portion 21, the second light-transmitting portion 22, and the third light-transmitting portion 23 are all disposed on the light-transmitting substrate S, and more specifically, are disposed on the same plane as the light-transmitting substrate S, but are different from the plane of the light emitting module 1, wherein the first light emitting unit 11 and the second light emitting unit 12 are disposed under the first light-transmitting portion 21, the second light-transmitting portion 22, and the third light-transmitting portion 23. Referring to FIG. 1B, another embodiment of the present disclosure provides a display device including a light emitting module 1, a patterned panel 2, and a light guide plate G. The light guide plate G is disposed under the patterned panel 2, and the light emitting module 1 has a first light emitting unit 11 and a second light emitting unit 12 disposed on the side of the light guide plate G.

Referring to FIG. 2A, the top schematic view of FIG. 1A illustrates the first light-transmitting portion 21, the second light-transmitting portion 22, and the third light-transmitting portion 23 being all disposed on the same surface of the light-transmitting substrate S, and the third light-transmitting portion 23 being adjacent to and engaged between the first light-transmitting portion 21 and the second light-transmitting portion 22.

Further referring to FIG. 2B, which illustrates the figure displayed by the display device D of the first embodiment of the present disclosure, the display device D is able to display two types of figures by using the combination of the first light-transmitting portion 1, the second light-transmitting portion 2 and the third light-transmitting portion 3. The figures are a first figure A and a second figure B, wherein the first figure A is displayed by cooperating the first light-transmitting portion 1 with the third light-transmitting portion 3, and the second figure B is displayed by cooperating the first light-transmitting portion 2 with the third light-transmitting portion 3.

Figure 2C:
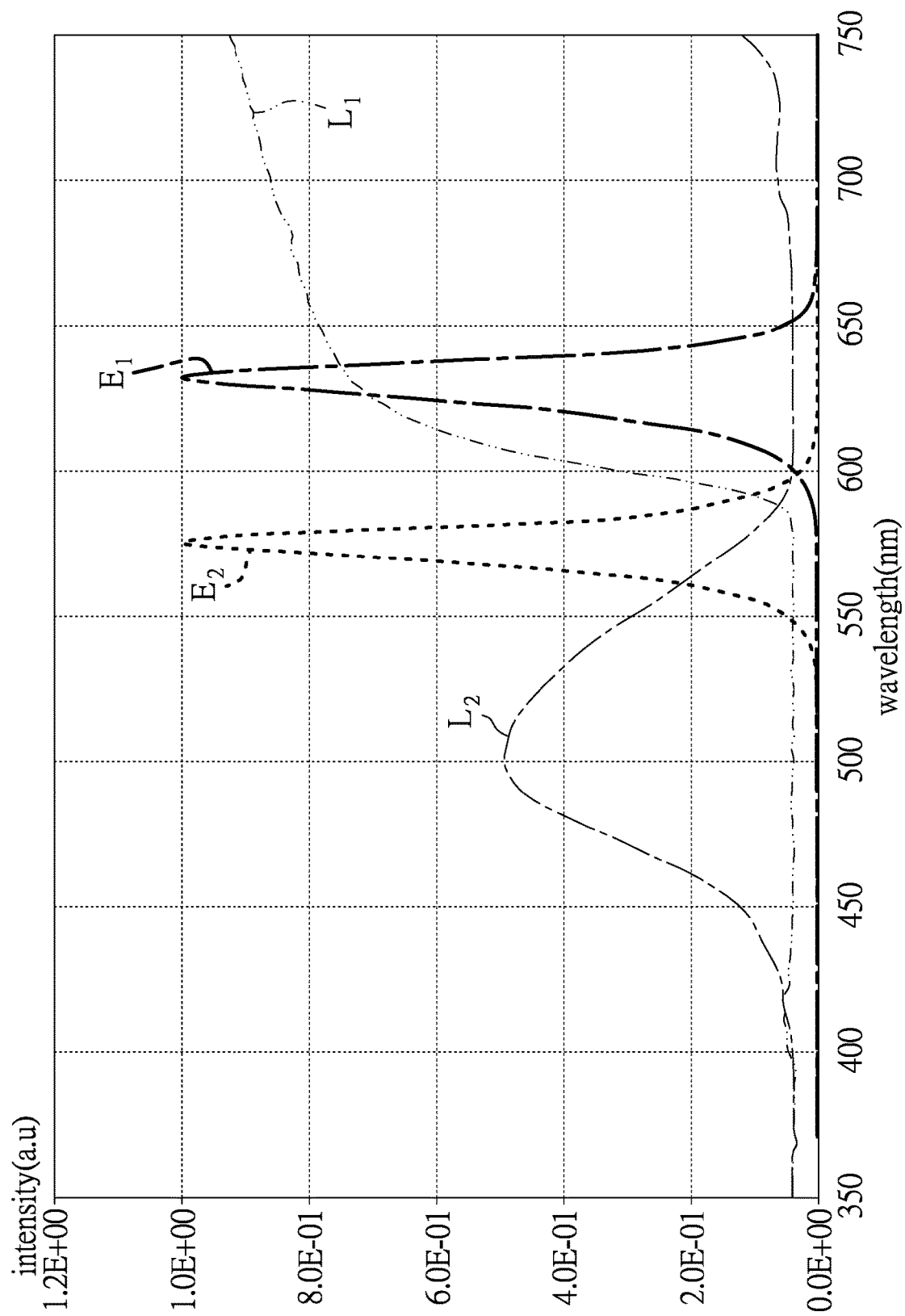
FIG. 2C shows a spectrum of the light-transmitting portion and the light emitting module according to a first configuration of the first embodiment of the present disclosure.

Next, referring to Table 1, which is the spectral characteristics of a first configuration, a second configuration, a third configuration and a fourth configuration, in conjunction with FIGS. 2C, 2D, 2E and 2F. The first configuration is shown in FIG. 2C, the first light-transmitting portion 21 is a red ink layer having a transmission spectrum $L_1$, the second light-transmitting portion 22 is a green ink layer having a transmission spectrum $L_2$, and the third light-transmitting portion 23 is a yellow ink layer having a transmission spectrum $L_4$. In the first configuration, the first lighting unit 11 includes a red LED having an emission spectrum $E_1$. When the red LED is activated, the red light emitted by the red LED only passes through the red ink layer (the first light-transmitting portion 21) and the yellow ink layer (the third light-transmitting portion 23), but the red light does not pass through the green ink layer (the second light-transmitting portion 22), such that the display device D shows the first figure A in a red color. Further, the second light emitting unit 12 includes a green LED having an emission spectrum $E_2$. When the green LED is activated, the green light emitted by the green LED only passes through the green ink layer (the second light-transmitting portion 22) and the yellow ink layer (the third light-transmitting portion 23), without the red ink layer (the first light-transmitting portion 21), such that the display device D shows the second figure B in a green color.

Figure 2D:
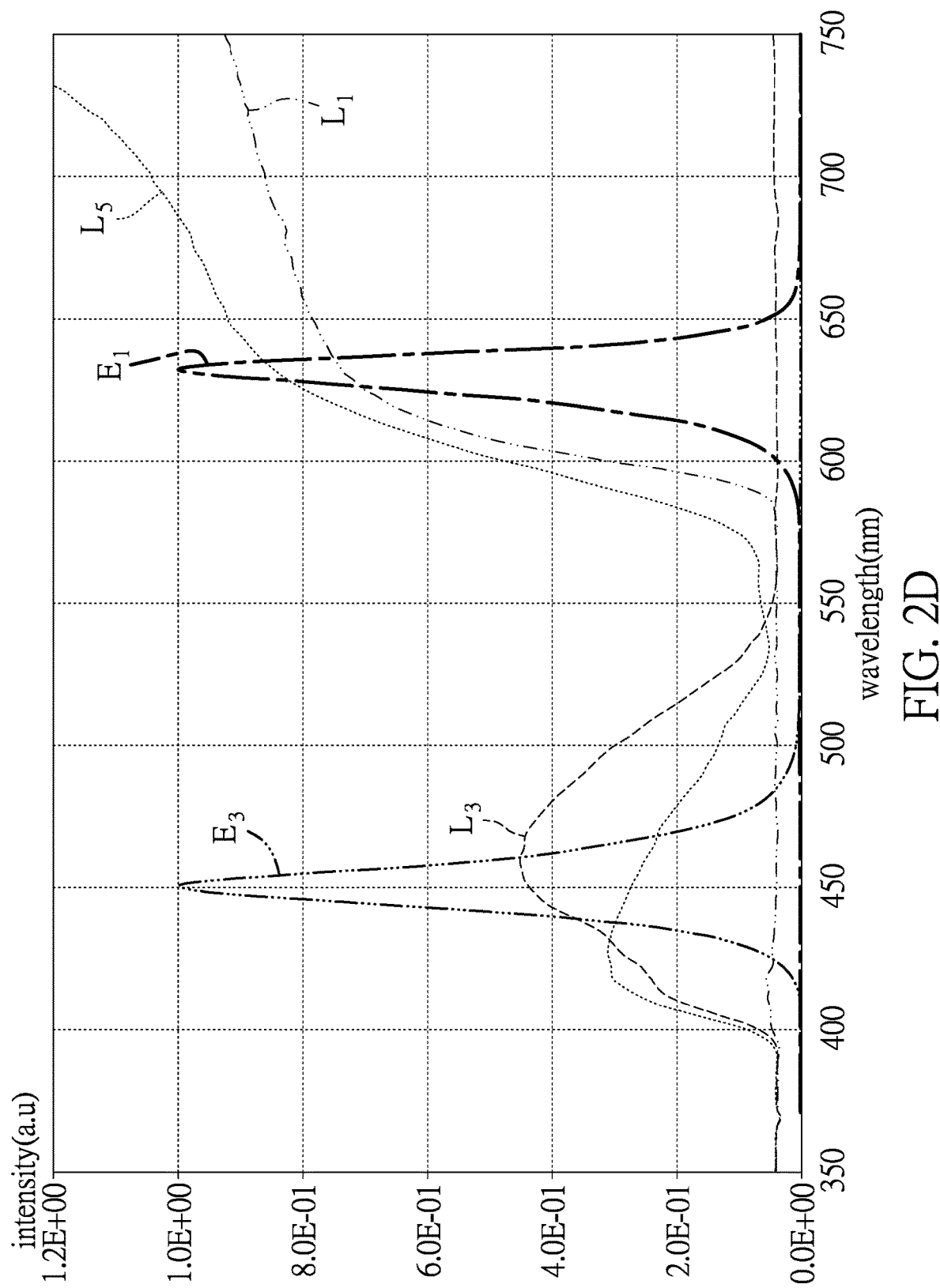
FIG. 2D shows a spectrum of the light-transmitting portion and the light emitting module according to a second configuration of the first embodiment of the present disclosure.

The second configuration is shown in FIG. 2D, the first light-transmitting portion 21 is a red ink layer having a transmission spectrum $L_1$, the second light-transmitting portion 22 is a blue ink layer having a transmission spectrum $L_3$, and the third light-transmitting portion 23 is a magenta ink layer having a transmission spectrum $L_5$. In the second configuration, the first lighting unit 11 includes a red LED having an emission spectrum $E_1$. When the red LED is activated, the red light emitted by the red LED only passes through the red ink layer (the first light-transmitting portion 21) and the magenta ink layer (the third light-transmitting portion 23), but the red light does not pass through the blue ink layer (the second light-transmitting portion 22), such that the display device D shows the first figure A in a red color. Further, the second light emitting unit 12 includes a blue LED having an emission spectrum $E_3$, When the blue LED is activated, the blue light emitted by the blue LED only passes through the blue ink layer (the second light-transmitting portion 22) and the magenta ink layer (the third light-transmitting portion 23), without the red ink layer (the first light-transmitting portion 21), such that the display device D shows the second figure B in a blue color.

Figure 2E:
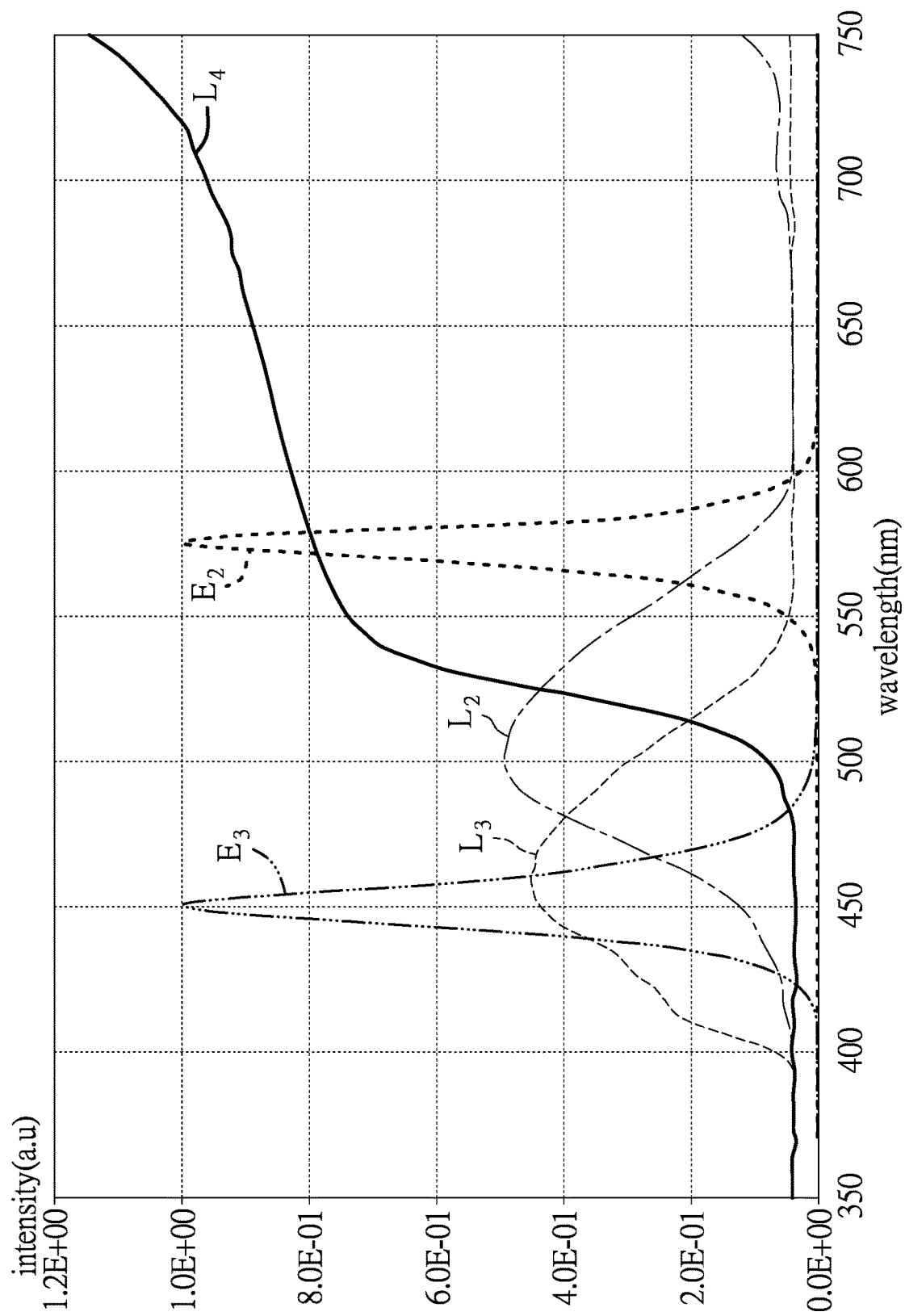
FIG. 2E shows a spectrum of the light-transmitting portion and the light emitting module according to a third configuration of the first embodiment of the present disclosure.

The third configuration is shown in FIG. 2E, the first light-transmitting portion 21 is a blue ink layer having a transmission spectrum $L_3$, the second light-transmitting portion 22 is a multi-layer which a green ink layer having a transmission spectrum $L_2$ at the top and a yellow ink layer having a transmission spectrum $L_4$ at the bottom, and the third light-transmitting portion 23 is a green ink layer having a transmission spectrum $L_2$. In the third configuration, the first lighting unit 11 includes a blue LED having an emission spectrum $E_3$, the light emitted by the blue LED only passes through blue ink layer (the first light-transmitting portion 21) and the green ink layer (the third light-transmitting portion 23), but the red light does not pass through the multi-layer (the second light-transmitting portion 22), such that the display device D shows the first figure A in a blue color. When the green LED is activated, the green light emitted by the green LED only passes through the multi-layer (the second light-transmitting portion 22), and the green ink layer (the third light-transmitting portion 23), without the blue ink layer (the first light-transmitting portion 21), thereby the display device D shows the second figure B in a green color.

Figure 2F:
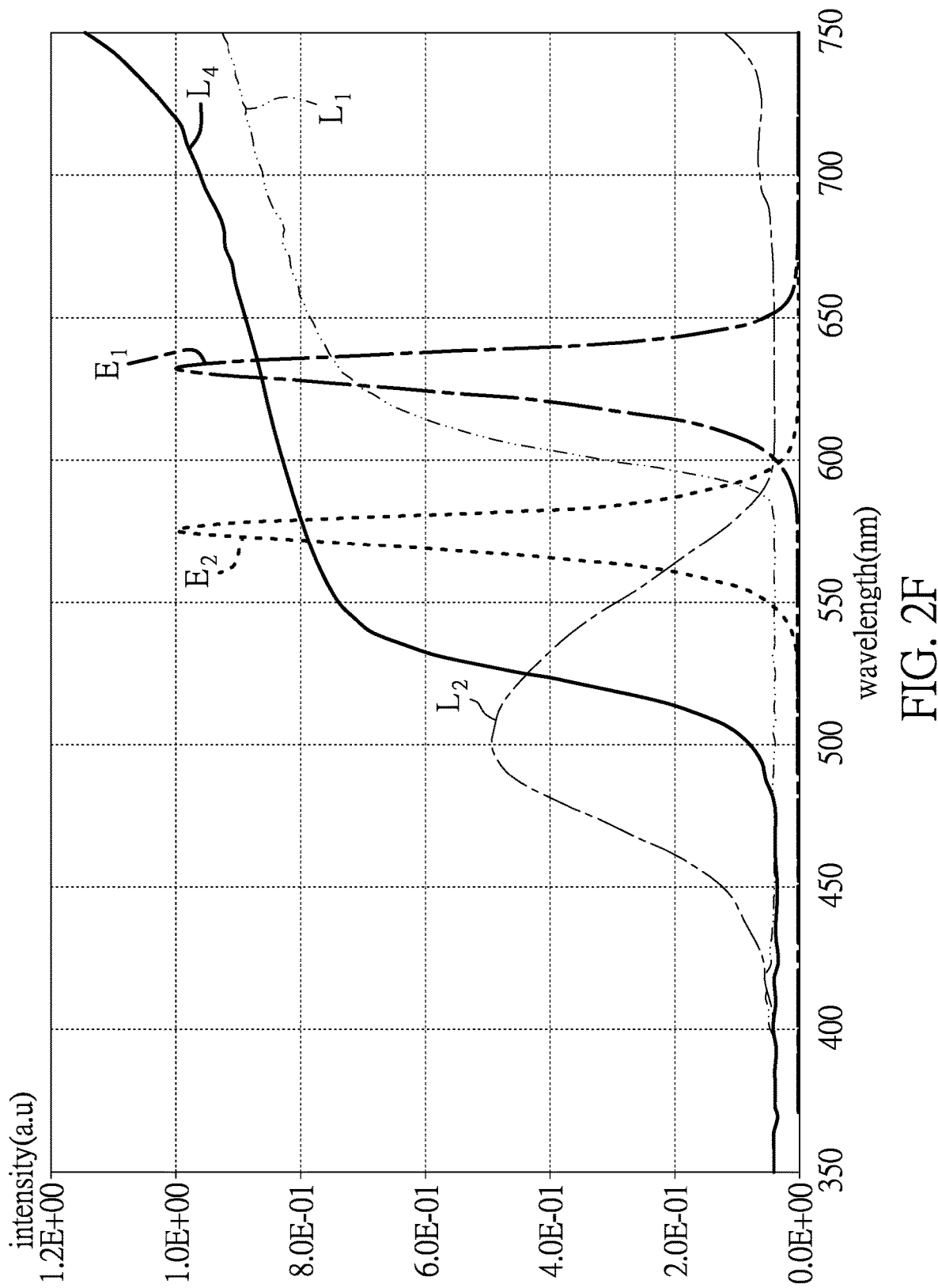
FIG. 2F shows a spectrum of the light-transmitting portion and the light emitting module according to the third configuration of the first embodiment of the present disclosure.

The fourth configuration is shown in FIG. 2F, the first light-transmitting portion 21 is a red ink layer having a transmission spectrum $L_1$, the second light-transmitting portion 22 is a multi-layer which a green ink layer having a transmission spectrum $L_2$ at the top and a yellow ink layer having a transmission spectrum $L_4$ at the bottom, and the third light-transmitting portion 23 is a yellow ink layer having a transmission spectrum $L_4$. In the fourth configuration, the first lighting unit 11 includes a red LED having an emission spectrum $E_1$, the red light emitted by the red LED only passes through red ink layer (the first light-transmitting portion 21) and the yellow ink layer (the third light-transmitting portion 23), but the red light does not pass through the multi-layer (the second light-transmitting portion 22), such that the display device D shows the first figure A in a red color. Further, the second light emitting unit 12 includes a green LED having an emission spectrum $E_2$, when the green LED is activated, the green light emitted by the green LED only passes through the multi-layer (the second light-transmitting portion 22) and the yellow ink layer (the third light-transmitting portion 23), without the red ink layer (the first light-transmitting portion 21), such that the display device D shows the second figure B in a green color.

TABLE 1

|  |  | First configuration (FIG. 2C) | Second configuration (FIG. 2D) | Third configuration (FIG. 2E) | Fourth configuration (FIG. 2F) |
| --- | --- | --- | --- | --- | --- |
| The first light-transmitting portion | The first transmission spectrum | $L_1$: 590 nm to 800 nm | $L_1$: 590 nm to 800 nm | $L_3$: 390 nm to 550 nm | $L_1$: 590 nm to 800 nm |
|  | color | red | red | blue | red |
| The second light-transmitting portion | The second transmission spectrum | $L_2$: 400 nm to 600 nm | $L_3$: 390 nm to 550 nm | $L_2$ and $L_4$ overlapping: 480 nm to 600 nm | $L_2$ and $L_4$ overlapping: 480 nm to 600 nm |
|  | color | green | blue | Green layer at the top, yellow layer at the bottom | Green layer at the top, yellow layer at the bottom |
| The third light-transmitting portion | The third transmission spectrum | $L_4$: 480 nm to 800 nm | $L_5$: 390 nm to 525 nm and 570 nm to 800 nm | $L_2$: 400 nm to 600 nm | $L_4$: 480 nm to 800 nm |
|  | color | yellow | magenta | green | yellow |
| The first overlapping part | wavelength range | 590 nm to 800 nm | 590 nm to 800 nm | 400 nm to 550 nm | 590 nm to 800 nm |
| The second overlapping part | wavelength range | 480 nm to 600 nm | 390 nm to 525 nm | 480 nm to 600 nm | 480 nm to 600 nm |
| The first light emitting unit | wavelength peak color | $E_1$: 630 nm red | $E_1$: 630 nm red | $E_3$: 450 nm blue | $E_1$: 630 nm red |
| The second light emitting unit | wavelength peak color | $E_2$: 575 nm green | $E_3$: 450 nm blue | $E_2$: 575 nm green | $E_2$: 575 nm green |

Second Embodiment

Figure 3A:
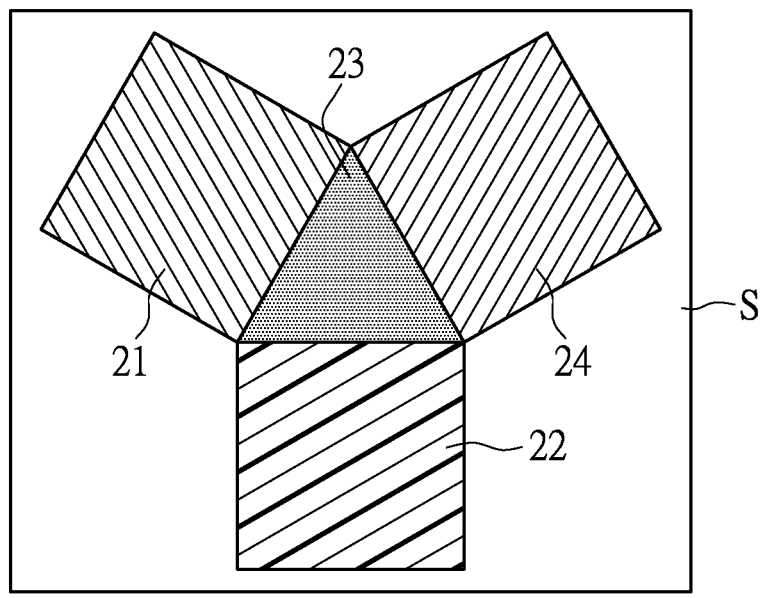
FIG. 3A is a top schematic view of a display device according to a second embodiment of the present disclosure.

Referring to FIG. 3A, a top schematic view of the display device D' provided by the second embodiment of the present disclosure is shown. The second embodiment of the present disclosure provides a display device D', including a light emitting module 1 and a patterned panel 2, the patterned panel 2 is disposed on the light emitting module 1. Furthermore, the light emitting module 1 includes a first light emitting unit 11 and the second light emitting unit 12, and a third light emitting unit 13 (not shown in the FIG.); the patterned panel 2 includes a light-transmitting substrate S, a first light-transmitting portion 21, a second light-transmitting portion 22, a third light-transmitting portion 23 and a fourth light-transmitting portion 24. Specifically, the first light-transmitting portion 21, the second light-transmitting portion 22, the third light-transmitting portion 23 and the fourth light-transmitting portion 24 are all disposed on the same plane of the light-transmitting substrate S, and the third light-transmitting portion 23 is adjacent to and engaged between the first light-transmitting portion 21, the second light-transmitting portion 22, and the fourth light-transmitting portion 24. The first light emitting unit 11 is located below the first light-transmitting portion 21, the second light emitting unit 12 is located below the first light-transmitting portion 22, and the third light emitting unit 13 is located below the fourth light-transmitting portion 24.

Figure 3B:
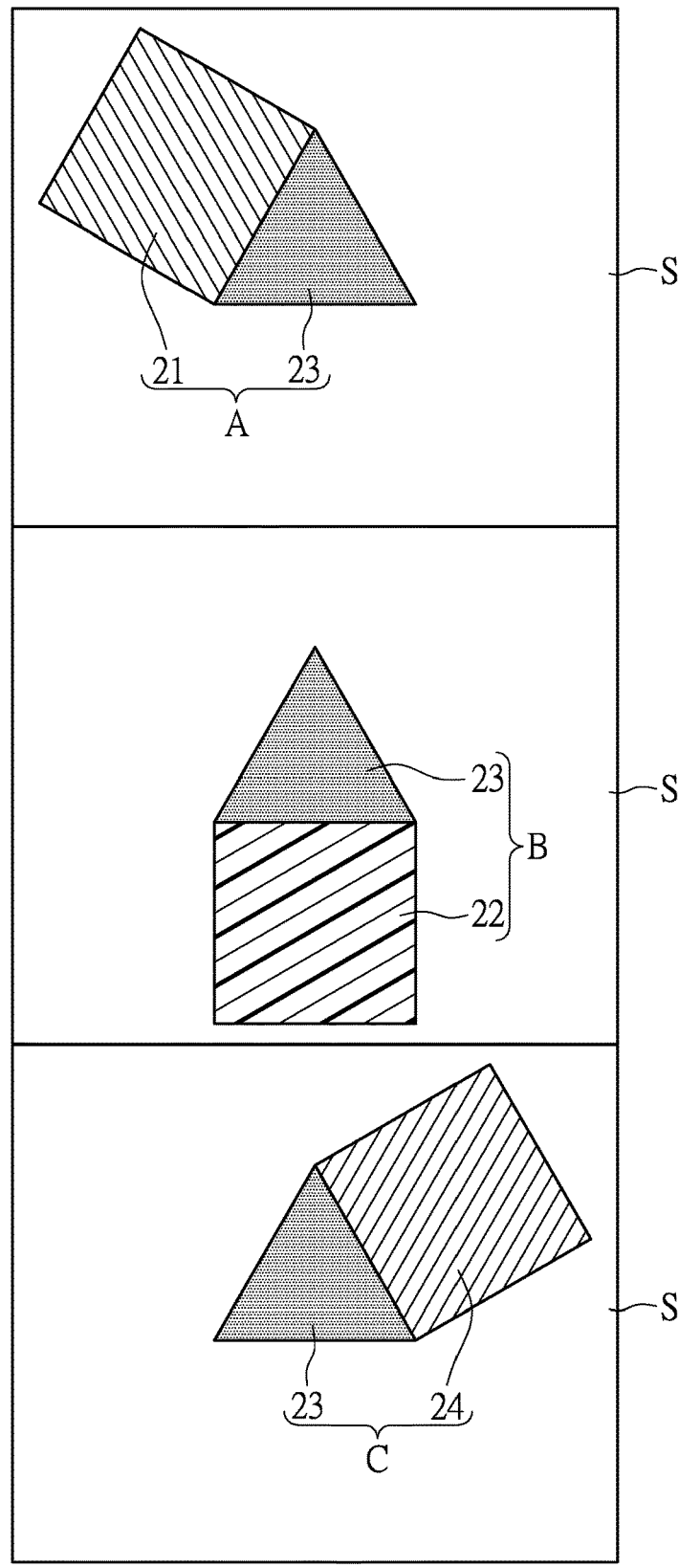
FIG. 3B is a top schematic view of a character pattern according to the second embodiment of the present disclosure.

Referring to FIG. 3B, the display device D' of the second embodiment is able to display three types of figures, respectively by the configuration of the first light-transmitting portion 21, the second light-transmitting portion 22, and the fourth light-transmitting portion 24, as well as the third light-transmitting portion 23. The three figures are respectively the first figure A formed by the first light-transmitting portion 21 and the third light-transmitting portion 23, the second figure B formed by the second light-transmitting portion 22 and the third light-transmitting portion 23, and the third figure C formed by the fourth light-transmitting portion 24 and the third light-transmitting portion 23.

Figure 3C:
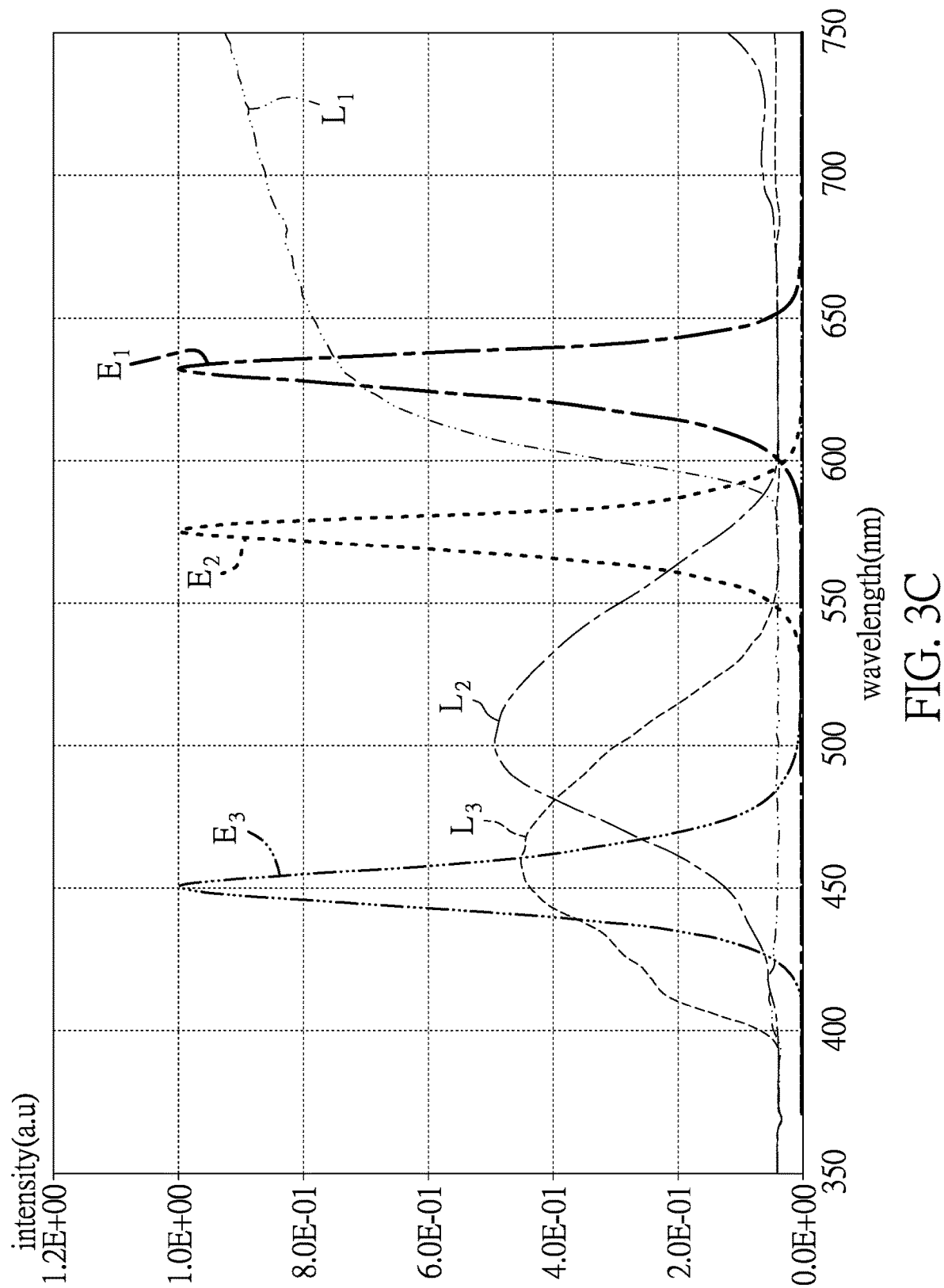
FIG. 3C shows a spectrum of the light-transmitting portion and the light emitting module according to the second embodiment of the present disclosure.

Next, referring to Table 2 in conjunction with FIG. 3C, which illustrates the spectral characteristics of component. Specifically, the first light-transmitting portion 21 is a red ink layer having a transmission spectrum L1, the second light-transmitting portion 22 is a multi-layer which a green ink layer having a transmission spectrum L2 at the top and a yellow ink layer having a transmission spectrum L4 at the bottom, and the third light-transmitting portion 23 is a white ink layer with light diffusing agent (fully transparent), further the fourth light-transmitting portion 24 is a blue ink layer having a transmission spectrum L3. On the other hand, the first light emitting unit includes a red LED having an emission spectrum of E1, the second light emitting unit includes a green LED having an emission spectrum of E2, and the third light emitting unit includes a blue LED having an emission spectrum of E3. Therefore, when the red LED is activated, the red light emitted by the red LED only passes through the red ink layer (the first light-transmitting portion 21) and the white ink layer (the third light-transmitting portion 23), but the red light does not pass through the multi-layer (the second light-transmitting portion 22) and the blue ink layer (the fourth light-transmitting portion 24), such that the display device D shows the first figure A in a red color. When the green LED is activated, the green light emitted by the green LED only passes through the multi-layer (the second light-transmitting portion 22) and the white ink layer (the third light-transmitting portion 23), without the red ink layer (the first light-transmitting portion 21), such that the display device D shows the second figure B in a green color. When the blue LED is activated, the blue light emitted by the blue LED only passes through the blue ink layer (the fourth light-transmitting portion 24) and the white ink layer (the third light-transmitting portion 23), without the red ink layer (the first light-transmitting portion 21) and the multi-layer (the second light-transmitting portion 22), such that the display device D shows the third figure C in a blue color.

TABLE 2

|  |  | Second Embodiment (FIG. 3C) |
|---|---|---|
| The first light-transmitting portion | The first transmission spectrum color | $L_1$: 590 nm to 800 nm red |
| The second light-transmitting portion | The second transmission spectrum color | $L_2$ and $L_4$ overlapping: 480 nm to 600 nm Green layer on the top, yellow layer at the below |
| The third light-transmitting portion | The third transmission spectrum color | transparent white |
| The fourth light-transmitting portion | The fourth transmission spectrum color | $L_3$: 390 nm to 550 nm blue |
| The first overlapping part | wavelength range | 590 nm to 800 nm |
| The second overlapping part | wavelength range | 480 nm to 600 nm |
| The third overlapping part | wavelength range | 390 nm to 550 nm |
| The first light emitting unit | wavelength peak color | $E_1$: 630 nm red |
| The second light emitting unit | wavelength peak color | $E_2$: 575 nm green |
| The third light emitting unit | wavelength peak color | $E_3$: 450 nm blue |

Third Embodiment

Figure 4A:
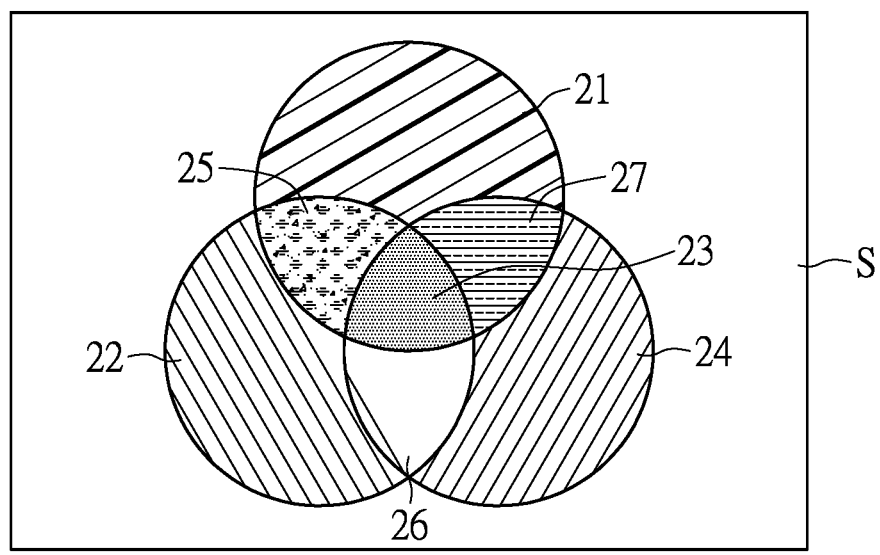
FIG. 4A is a top schematic view of a display device according to a third embodiment of the present disclosure.
Figure 4B:
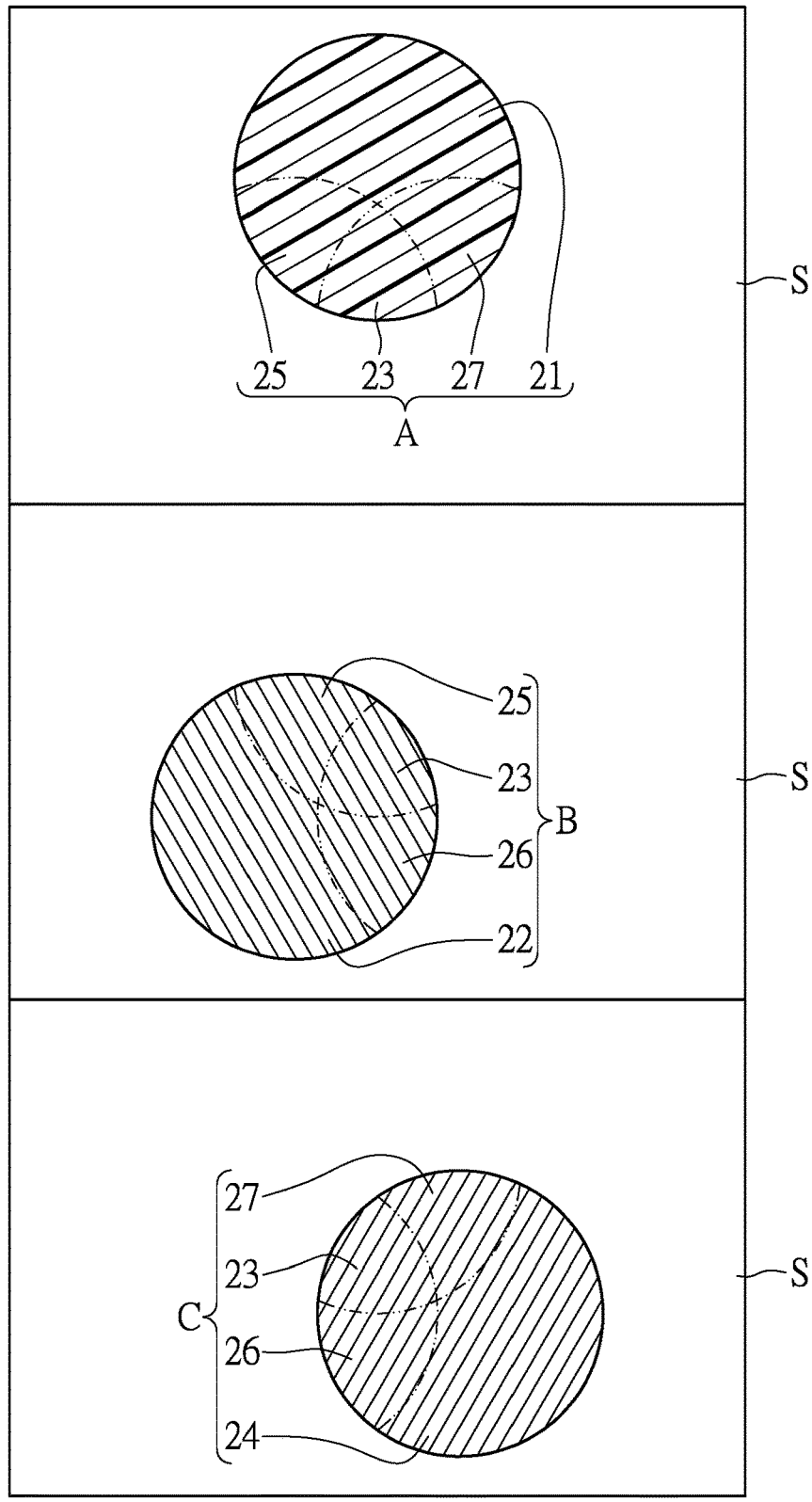
FIG. 4B is a top schematic view of a character pattern according to the third embodiment of the present disclosure.

Referring to FIG. 4A, which is a top schematic view of the display device D" provided by the third embodiment of the present disclosure. As shown in FIG. 4A, the third embodiment of the present disclosure provides a display device D", including a light emitting module 1 and a patterned panel 2, the patterned panel 2 is disposed on the light emitting module 1. Furthermore, the light emitting module 1 includes a first light emitting unit 11 and the second light emitting unit 12, and a third light emitting unit 13 (not shown in the FIG.); the patterned panel 2 includes a light-transmitting substrate S, a first light-transmitting portion 21 to a seventh light-transmitting portion 27. Specifically, referring to FIG. 4B, through the first light-transmitting portion 21 to the seventh light-transmitting portion 27, the display device D" of the second embodiment is able to display different types of figures, respectively being the first figure A formed by the first light-transmitting portion 21, the third light-transmitting portion 23, the fifth light-transmitting portion 25, and the seventh light-transmitting portion 27, the second figure B formed by the second light-transmitting portion 22, the third light-transmitting portion 23, the fifth light-transmitting portion 25, and the sixth light-transmitting portion 26, and the third figure C formed by the fourth light-transmitting portion 24, the third light-transmitting portion 23, the sixth light-transmitting portion 26 and the seventh light-transmitting portion 27.

Figure 4C:
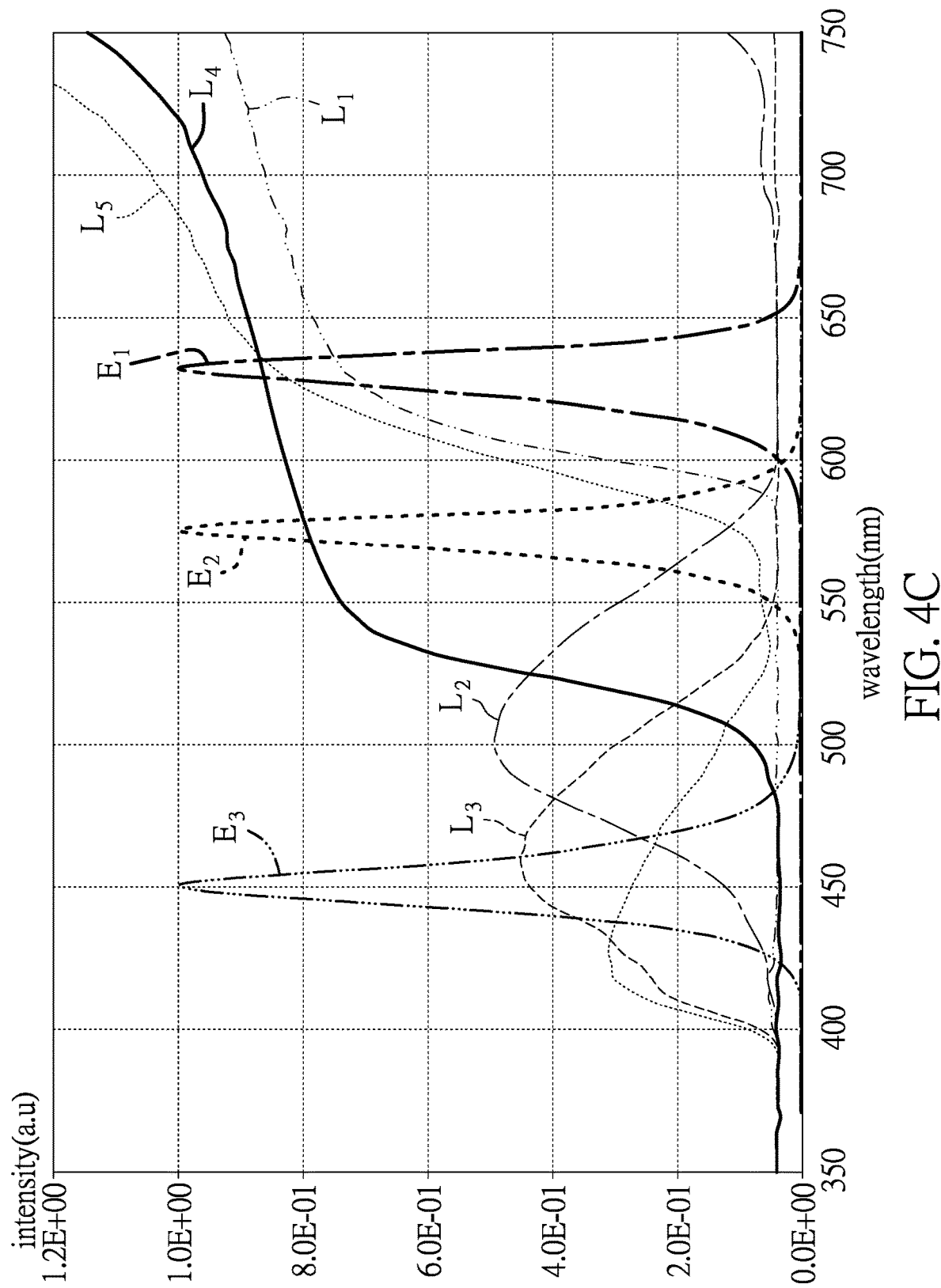
FIG. 4C shows a spectrum of the light-transmitting portion and the light emitting module according to the third embodiment of the present disclosure.

Next, referring to Table 3 in conjunction with FIG. 4C, which show the spectral characteristics of component. Specifically, the first light-transmitting portion 21 is a red ink layer having a transmission spectrum $L_1$, the second light-transmitting portion 22 is a multi-layer which a green ink layer having a transmission spectrum $L_2$ at the top and a yellow ink layer having a transmission spectrum $L_4$ at the bottom, and the third light-transmitting portion 23 is a white ink layer with light diffusing agent (full transparent), further, the fourth light-transmitting portion 24 is a blue ink layer having a transmission spectrum $L_3$. Furthermore, the fifth light-transmitting portion 25 is a yellow ink layer having a transmission spectrum $L_4$; the light-transmitting portion 26 is a green ink layer having a transmission spectrum $L_2$; and the light-transmitting portion 27 is a magenta ink layer having a transmission spectrum $L_5$. On the other hand, the first light emitting unit includes a red LED having an emission spectrum of $E_1$; the second light emitting unit includes a green LED having an emission spectrum of $E_2$; and the third light emitting unit includes a blue LED having an emission spectrum of $E_3$. Therefore, when the red LED is activated, the red light emitted by the red LED only passes through the red ink layer (the first light-transmitting portion 21), the white ink layer (the third light-transmitting portion 23), the yellow ink layer (fifth light-transmitting portion 25), and the magenta ink layer (the seventh light-transmitting portion 27), but the red light does not pass through the rest of light-transmitting portions, such that the display device shows the first figure A in a red color. When the green LED is activated, the green light emitted by the green LED only passes through the multi-layer (the second light-transmitting portion 22), the white ink layer (the third light-transmitting portion 23), the yellow ink layer (fifth light-transmitting portion 25), and the green ink layer. (sixth light-transmitting portion 26), but the green light does not pass through the rest of light-transmitting portions, such that the display device D shows the second figure B in a green color. When the blue LED is activated, the blue light emitted by the blue LED only passes through the blue ink layer (the fourth light-transmitting portion 24), the white ink layer (the third light-transmitting portion 23), the green ink layer (sixth light-transmitting portion 26), and the magenta ink layer (seventh light-transmitting portion 27), but the blue light does not pass through the rest of light-transmitting portions, such that the display device D shows the third figure C in a blue color.

TABLE 3

| The light-transmitting portion | | Third Embodiment (FIG. 4C) |
|---|---|---|
| The first light-transmitting portion | The first transmission spectrum | $L_1$: 590 nm to 800 nm |
| | color | red |
| The second light-transmitting portion | The second transmission spectrum | $L_2$ and $L_4$ overlapping part: 480 nm to 600 nm |
| | color | Green layer at the top, yellow layer at the bottom |
| The third light-transmitting portion | The third transmission spectrum | Full transparent |
| | color | transparent/white |
| The fourth light-transmitting portion | The fourth transmission spectrum | 390 nm to 550 nm |
| | color | blue |
| The fifth light-transmitting portion | The fifth transmission spectrum | $L_4$: 480 nm to 800 nm |
| | color | yellow |
| The sixth light-transmitting portion | The sixth transmission spectrum | $L_2$: 400 nm to 600 nm |
| | color | green |
| The seventh light-transmitting portion | The seventh transmission spectrum | $L_5$: 390 nm to 525 nm and 570 nm to 800 nm |
| | color | magenta |
| The first overlapping part | wavelength range | 590 nm to 800 nm |
| The second overlapping part | wavelength range | 480 nm to 600 nm |
| The third overlapping part | wavelength range | 400 nm to 525 nm |
| The first light emitting unit | wavelength peak | $E_1$: 630 nm |
| | color | red |
| second light emitting unit | wavelength peak | $E_2$: 575 nm |
| | color | green |
| third light emitting unit | wavelength peak | $E_3$: 450 nm |
| | color | blue |

Fourth Embodiment

Figure 5A:
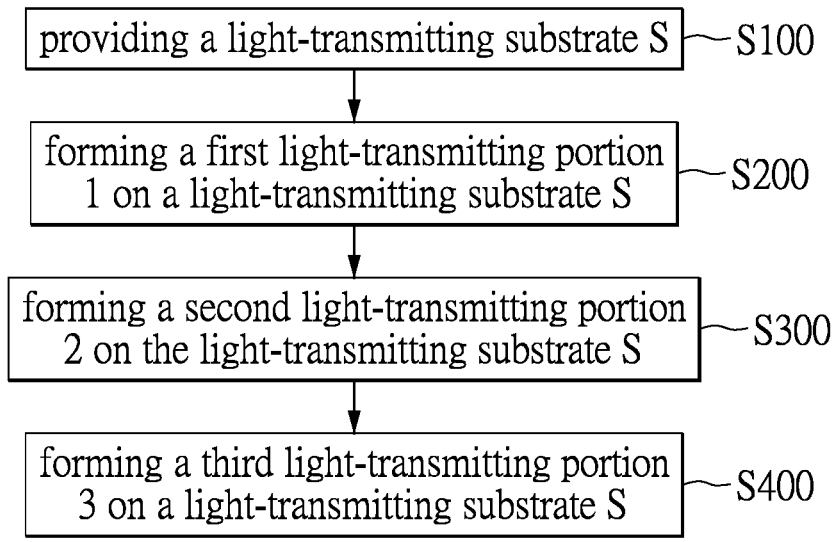
FIG. 5A is a flowchart of a method of manufacturing the patterned panel according to an embodiment of the present disclosure.

In addition to the display device provided by the first to third embodiments of the present disclosure, the present disclosure further provides a method for manufacturing a patterned panel and a display device including the patterned panel, referring to FIG. 5A, which is a flowchart of a method of manufacturing the patterned panel of the present disclosure, the method comprising:

S100: providing a light-transmitting substrate S;

S200: forming a first light-transmitting portion 1 on a light-transmitting substrate S;

S300: forming a second light-transmitting portion 2 on the light-transmitting substrate S; and S400: forming a third light-transmitting portion 3 on a light-transmitting substrate S.

Figure 5B:
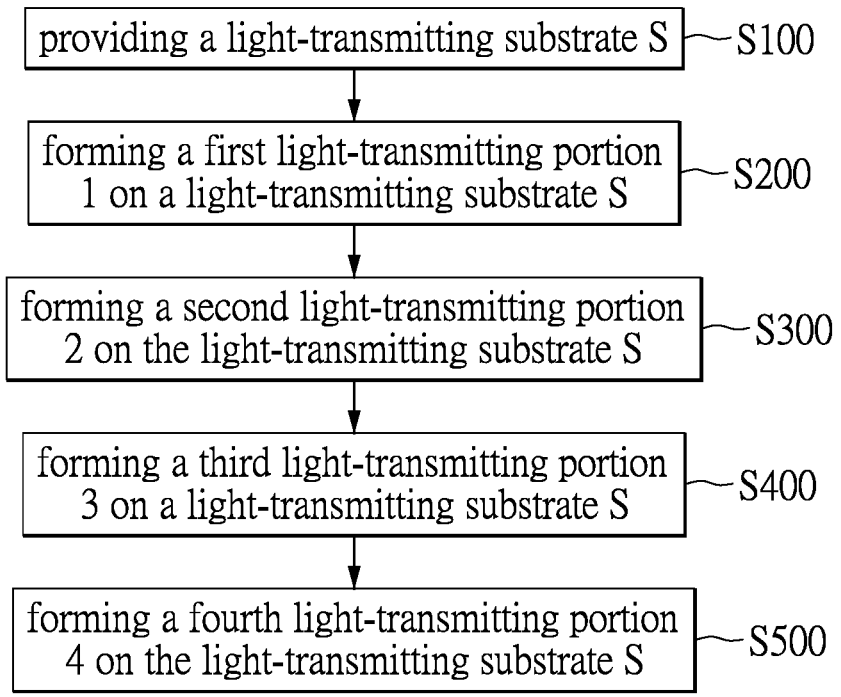
FIG. 5B is a flowchart of a method of manufacturing the patterned panel according to another embodiment of the present disclosure.

Referring to FIG. 5B, the method of manufacturing the patterned panel of the present disclosure further includes:

S500: forming a fourth light-transmitting portion 4 on the light-transmitting substrate S, wherein the fourth light-transmitting portion 4 is adjacent to the third light-transmitting portion 3, the fourth light-transmitting portion 4 has a fourth transmission spectrum, and the third transmission spectrum partially overlaps with the fourth transmission spectrum.

The first light-transmitting portion 21, the second light-transmitting portion 22, the third light-transmitting portion 23, and the fourth light-transmitting portion 24 and its transmission spectrum are as described above, and will not be reiterated herein.

Furthermore, the method of forming the light-transmitting portion S200, S300, S400, and S500 are not limited to being in any specific order.

Specifically, the method of forming the first light-transmitting portion 21, the second light-transmitting portion 22, the third light-transmitting portion 23, and the fourth light-transmitting portion 24 may be performed by evaporation, sputtering, or conventional ink printing. Preferably, the method of forming the light-transmitting portion is printed with conventional inks, so as to produce figures with finer details.

Next, a suitable light emitting module, such as one described in the foregoing description, can be further selected, and the patterned panel can be disposed on the light emitting module to obtain the display device of the present disclosure.

In conclusion, one of the beneficial effects of the present disclosure is that the display device provided by the present disclosure has technical features "a third light-transmitting portion being disposed on the light-transmitting substrate and having a third transmission spectrum", "the third light-transmitting portion being adjacent to the first light-transmitting portion and the second light-transmitting portion" and "the third transmission spectrum and the first transmission spectrum having a first overlapping part, and the third transmission spectrum and the second transmission spectrum having a second overlapping part", such that, the patterned panel of the present disclosure cooperates with light emitting modules, the patterned panel of the display device is able to display different characters, symbols or patterns on nearby or same surface area on the patterned panel, so as to effectively reduce the area of the patterned panel and the size of the display device.

Furthermore, by virtue of "the third light-transmitting portion" of the present disclosure, the first light-transmitting portion, the second light-transmitting portion, and the fourth light-transmitting portion are able to be disposed on the same plane of the light-transmitting substrate, effectively reducing the thickness of the patterned panel.

Moreover, the technical feature "the third light-transmitting portion" of the present disclosure not only reduces the area and thickness of the patterned panel, but also increases the color richness of the patterned panel. The wavelength range of the specific transmission spectrum of the present disclosure enhances the color accuracy of the display device and can avoid chromatic aberration.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A display device, comprising:
    a light emitting module including a first light emitting unit and a second light emitting unit; and
    a patterned panel disposed on the light emitting module, wherein the patterned panel includes:
        a light-transmitting substrate;
        a first light-transmitting portion disposed on the light-transmitting substrate and having a first transmission spectrum;
        a second light-transmitting portion disposed on the light-transmitting substrate, and having a second transmission spectrum; and
        a third light-transmitting portion disposed on the light-transmitting substrate, and the third light-transmitting portion has a third transmission spectrum;
    wherein the third light-transmitting portion is adjacent to the first light-transmitting portion and the second light-transmitting portion; the third transmission spectrum and the first transmission spectrum have a first overlapping part; the third transmission spectrum and the second transmission spectrum have a second overlapping part;
    wherein the first light emitting unit emits a first light through the patterned panel, the first light has a peak wavelength in the first overlapping part, the second light emitting unit emits a second light through the patterned panel, the second light has a peak wavelength in the second overlapping part.

2. The display device according to claim 1, wherein the third light-transmitting portion is in direct contact with the first light-transmitting portion or the second light-transmitting portion.

3. The display device according to claim 1, wherein the third light-transmitting portion is not in direct contact with the first light-transmitting portion or the second light-transmitting portion.

4. The display device according to claim 1, wherein the peak wavelength of the first light is not in the second transmission spectrum.

5. The display device according to claim 4, wherein the wavelength range of the first light is not in the second transmission spectrum.

6. The display device according to claim 1, wherein the peak wavelengths of the first light and the second light are respectively from 400 nm to 550 nm, from 500 nm to 580 nm, or from 600 nm to 660 nm.

7. The display device according to claim 1, wherein the transmittance of the first light transmitting through the first light-transmitting portion and the third light-transmitting portion is more than 5%.

8. The display device according to claim 1, wherein the transmittance of the second light transmitting through the second light-transmitting portion and the third light-transmitting portion is more than 5%.

9. The display device according to claim 1, wherein the light emitting module further includes a light guide plate, and wherein the first light emitting unit and the second light emitting unit are disposed on a side of the light guide plate.

10. The display device according to claim 1, wherein the first light emitting unit and the second light emitting unit are disposed under the first light-transmitting portion, the second light-transmitting portion, and the third light-transmitting portion.

11. The display device according to claim 1, wherein at least one of the first light-transmitting portion, the second light-transmitting portion, and the third light-transmitting portion is in a multi-layer configuration.

12. The display device according to claim 1, wherein the patterned panel further includes
    a fourth light-transmitting portion disposed on the light-transmitting substrate, and having a fourth transmission spectrum;
    wherein the fourth light-transmitting portion is adjacent to the third light-transmitting portion;
    wherein the third transmission spectrum and the fourth transmission spectrum have a third overlapping part; and
    wherein the light emitting module includes a third light emitting unit, the third light emitting unit emits a third light through the patterned panel, the third light has a peak wavelength in the third overlapping part.

13. The display device according to claim 12, wherein the peak wavelength of the third light is not in the first transmission spectrum and the second transmission spectrum.

14. The display device according to claim 13, wherein the wavelength range of the third light is not in the first transmission spectrum and the second transmission spectrum.

15. The display device according to claim 11, wherein the transmittance of the third light transmitting through the fourth light-transmitting portion and the third light-transmitting portion is more than 5%.

16. A method of manufacturing a display device, comprising:
providing a light-transmitting substrate;
forming a first light-transmitting portion having a first transmission spectrum on a light-transmitting substrate;
forming a second light-transmitting portion having a second transmission spectrum on the light-transmitting substrate;
forming a third light-transmitting portion having a third transmission spectrum on a light-transmitting substrate;
providing a light emitting module under the light-transmitting substrate, the light emitting module includes has a first light emitting unit and a second light emitting unit;
wherein the third light-transmitting portion is adjacent to the first light-transmitting portion and the second light-transmitting portion; and the third transmission spectrum is partially overlapping with the first transmission spectrum and the second transmission spectrum respectively.

17. The method of manufacturing a display device according to claim 16, wherein the third light-transmitting portion is in direct contact with the first light-transmitting portion.

18. The method of manufacturing a display device according to claim 16, wherein the third light-transmitting portion is in direct contact with the second light-transmitting portion.

19. The method of manufacturing a display device according to claim 16, wherein the peak wavelength of the first light is not in the second transmission spectrum.

20. The method of manufacturing a display device according to claim 19, wherein the wavelength range of the first light is not in the second transmission spectrum.

* * * * *